Patented Aug. 21, 1951

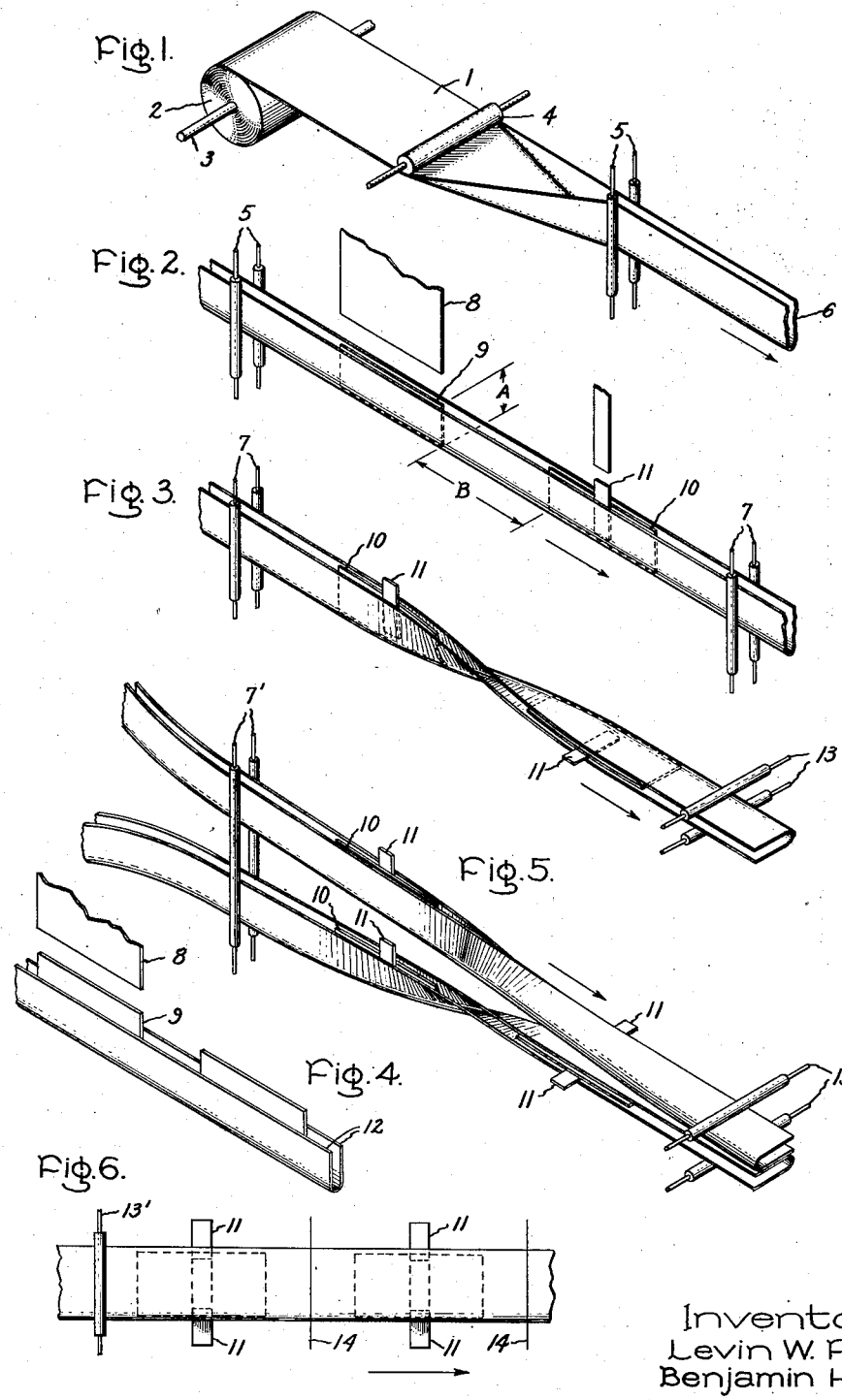
Inventors:
Levin W. Foster,
Benjamin H. Goldy,
by Ernest C. Britton
Their Attorney.

2,565,301

UNITED STATES PATENT OFFICE 2,565,301

MANUFACTURING PROCESS FOR MINIATURE HIGH-VOLTAGE CAPACITORS

Levin W. Foster and Benjamin H. Goldy, Pittsfield, Mass., assignors to General Electric Company, a corporation of New York Application October 29, 1947, Serial No. 782,710

3 Claims. (Cl. 29—25.42)

This invention relates to the method of making capacitors or condensers and more particularly to the method of making capacitors of a novel construction disclosed as one of the modifications in our co-pending application, Serial No. 776,482, filed September 27, 1947, and now abandoned.

As pointed out therein, one type of conventional prior art capacitors consists essentially of alternate continuous strips or sheets of metal foils or electrodes and similar but separate sheets of dielectric material. In this type of construction, the transverse width dimension of the dielectric sheets is in excess of the transverse width of the adjacent electrodes or foils and the two are alternately assembled so that the longitudinal edges of the dielectric sheets project beyond or overlap the longitudinal edges of the electrodes. The amount of overlap is determined by the maximum voltage which will be impressed upon the capacitor in service so that as the expected voltage is increased the amount of overlap must be increased which means, of course, that the overall transverse width of the capacitor is increased. To limit this increase in the case of high voltages, we have disclosed in our above-mentioned co-pending application, a novel construction in which the opposite longitudinal edges of adjacent electrodes are completely enclosed or enveloped by sheets or strips of dielectric material. We have thereby provided a capacitor construction in which the dielectric creepage distance between electrodes has been increased above and at the same time, the overall dimensions have been decreased below a similar prior art capacitor having equal capacitance.

It is, therefore, an object of our invention to provide a new method of manufacturing capacitors generally of the dry type employing a solid dielectric comprised of alternate strips or sheets of metal foils or electrodes and strips or sheets of dielectric material.

It is a further object of our invention to provide a novel method of constructing capacitors in which opposite faces of an electrode or plate are adjacent or in contact with the same face of a sheet or strip of solid dielectric material and opposite longitudinal edges of adjacent electrodes are completely enclosed or enveloped by separate folded dielectric sheets.

It is still a further object of our invention to provide a novel method of constructing capacitors in which the dielectric creepage distance between electrodes has been increased above and at the same time the overall dimensions have been decreased below a similar conventional or prior art capacitor having equal capacitance.

Our invention will be better understood from the following description when taken in connection with the accompanying drawing and the scope of our invention will be pointed out in the appended claims. In the drawing, Figures 1, 2 and 3 illustrate successive steps in the method of forming separate electrode and adjacent dielectric assemblies of a particular capacitor construction; Fig. 4 illustrates a modified capacitor construction which may also be assembled by the steps illustrated in Figures 1, 2 and 3; Fig. 5 illustrates an alternate step following that illustrated in Fig. 2 in which a plurality of separate electrode and adjacent dielectric assemblies are stacked or superimposed upon each other, and Fig. 6 illustrates a step following either that of Fig. 3 or that of Fig. 5 in which the separate electrode and adjacent dielectric assemblies are separated or severed from each other.

Hereinafter, when we refer to a strip, a single continuous strip or a folded strip of dielectric material, we mean either a single homogeneous strip or a laminated strip build up of several similar strips of dielectric material.

Although our method steps may be performed by hand, in the practice of our invention we employ a number of pairs of parallel and spaced rollers through which either a single strip or a laminated strip built up of several similar sheets of impregnated dielectric material is fed during the various stages of manufacture. Specifically, a single continuous strip of dielectric material 1 is unwound from a roll 2 mounted on a rotatable shaft 3 over or under a guide roller 4, then between a pair of vertically mounted parallel and spaced rollers 5 which serves the purpose of continuously folding the dielectric strip upon itself as fed therethrough so that thereafter any transverse or lateral cross section through the strip will be U-shaped, as indicated by the numeral 6. The folded dielectric strip then passes in the direction of the arrow from rollers 5 between another pair of vertically mounted parallel rollers 7, which are spaced closer together than the pair of rollers 5. Intermediate rollers 5 and 7, a mechanism, not shown, ejects conducting electrode or foil material 8, cuts the same into longitudinal strips 9, 10, etc., and drops them into the U-shaped groove of the folded dielectric strip. The mechanism is so timed in relation to the travel speed of the folded dielectric strip that the ends of each ejected and cut electrode strip will be spaced in the fold a predetermined distance, such as B, from the ends of an adjacent electrode strip. Thereafter, another mechanism, not shown, ejects, cuts and drops a conducting tap strap or terminal 11 into the fold adjoining or in contact with each electrode strip as it passes thereby. This latter step is necessary for a particular capacitor construction in which the transverse width of each electrode strip A is less than the transverse width of the folded dielectric strip. In such cases, one longitudinal edge of each electrode is completely enclosed or enveloped by the folded U-shaped dielectric sheet while the legs of the U project or extend beyond the opposite longitudinal edge of each electrode so that means must be provided such as the tap straps 11 for electrically connecting upon final assembly, each electrode to an external terminal.

It should, however, be understood that the above steps, exclusive of the tap strap insertion step, are equally applicable to another capacitor construction illustrated by Fig. 4 in which the ejected electrode strips are cut with a transverse width in excess of the transverse width of the folded dielectric strip so that after insertion into the U-shaped fold a longitudinal edge of each electrode extends or projects beyond the unfolded or free longitudinal edges 12 of the folded dielectric strip. In this case, the projecting portion of each electrode serves later for a terminal connection. Rollers 7, as pointed out above, are spaced relatively close together in comparison to the spacing between rollers 5 whereby the assembled folded dielectric strip and the electrodes with tap straps therein is sufficiently compressed upon passage therebetween so that the electrodes and tap straps will be maintained in their inserted position during later steps of the manufacturing process. These consist of passing the folded strip between a pair of horizontally mounted parallel and spaced rollers 13 whereby the strip is twisted from a vertical plane into a horizontal plane as illustrated at Fig. 3 and thereafter dividing or cutting the folded dielectric strip into separate parts by laterally severing the strip at intermediate points between the ends of the spaced electrodes therein. Although not a part of our invention, the separate parts may thereafter be stacked mechanically or by hand so that the enveloping or folded longitudinal edge of one part will be superimposed on the unfolded or free longitudinal edges of an adjacent part after which the stacked assembly may be inserted as is or rolled or folded and then inserted into a suitable container as explained in our co-pending application hereinbefore mentioned.

We have found it expeditious in manufacturing two-plate or electrode capacitors to simultaneously unroll a second dielectric strip as strip 1 is unrolled, pass the second strip between another pair of vertical parallel rollers, such as 5, to form the strip into a U-shape, simultaneously insert a plurality of spaced electrodes and tap straps therein at the same time as corresponding electrode strips and tap straps 8, 9, 10, etc., are inserted in the first folded strip, then feeding both folded dielectric strips with spaced electrodes and tap straps therein between a pair of vertical, parallel and spaced rollers 7', as indicated in Fig. 5. Thereafter, both folded dielectric strips are twisted from a vertical into a horizontal plane and the folded longitudinal edge of one dielectric strip is superimposed on or above the unfolded or free longitudinal edges of the other dielectric strip by passage between a pair of horizontal, parallel and spaced rollers 13'.

The travel speed of both dielectric strips, the dimensions of all electrode strips inserted therein and the spacing between adjacent electrodes are all so coordinated that after passage between rollers 13' the edges of each electrode in one folded dielectric strip will be superimposed above or on the edges of a corresponding electrode in the other folded dielectric strip. Finally, both folded dielectric strips are simultaneously severed at an intermediate point, such as 14, Fig. 6, between the ends of spaced electrodes to form a plurality of separate two-plate capacitors each ready for folding or rolling and insertion into a container.

Obviously, the above steps of our invention may be employed to manufacture capacitors having more than two plates by simultaneously unrolling a plurality of dielectric strips, then simultaneously and separately folding each strip, then simultaneously inserting corresponding spaced electrodes and tap straps therein, after which all folded dielectric strips are brought together and superimposed upon one another into a stack so that the folded longitudinal edge of alternate dielectric strips are aligned, and finally cutting the stack into a plurality of separate multi-plate capacitor assemblies.

Although we have illustrated more or less the total steps, in a particular order, of the passage of a dielectric strip or strips through a number of pairs of rollers, we desire to have it understood that the disclosed number of steps, the particular order and the means employed are only illustrative and the invention may be carried out otherwise. For example, the invention may be carried out by merely folding a dielectric sheet into the shape disclosed and inserting a conducting electrode in the fold thereof or by folding a dielectric strip as disclosed, inserting an electrode therein and separating the folded dielectric strip with electrode therein from the rest of the folded strip by severing the same adjacent the end of the electrode. Moreover, the dielectric strip or strips may be passed through a number of plates with slots therein in lieu of pairs of rollers or, as previously indicated, each step may be carried out by hand.

What we claim as new and desire to secure by Letters Patent of the United States is:

1. The process of making capacitors which comprises folding a strip of dielectric material longitudinally upon itself to form a U-shaped lateral cross section, folding another similar strip in a similar fashion, inserting a plurality of conducting electrodes at spaced points into the fold formed by each folded dielectric strip so that the ends of adjacent electrodes within each folded strip will be spaced a predetermined and equal distance, then laying one folded strip upon the other folded strip so that the folded longitudinal edge of one strip will be superimposed on the unfolded edges of the other strip and each spaced electrode within one folded strip will be superimposed on a spaced electrode within the other strip and then cutting the pair of folded dielectric strips into a plurality of separate parts by laterally severing the pair at a point intermediate the ends of adjacent electrodes.

2. The process of making capacitors which comprises longitudinally folding a plurality of separate strips of dielectric material whereby each strip presents a U-shaped lateral cross section, inserting at spaced points into the fold formed by each folded dielectric strip a plurality of conducting electrode strips so that the ends of adjacent electrodes within each folded strip will be spaced a predetermined equal distance each of said electrode strips having equal widths less than the width of said folded dielectric strips so that the unfolded longitudinal edges of each folded dielectric strip will project beyond a longitudinal edge of each electrode strip therein, inserting into the fold of each of said folded dielectric strips a plurality of conducting tap straps so that a tap strap will be contiguous to each electrode strip each of said tap straps having a length in excess of the transverse width of the folded dielectric sheets so that each of said tap straps will project beyond the unfolded longitudinal edges of each folded dielectric strip after insertion therein, then laying the plurality of folded dielectric strips with electrode strips and tap straps therein upon each other so that the folded longitudinal edge of a folded dielectric strip will be superimposed on the unfolded edges of an adjacent folded dielectric strip and the edges of each spaced electrode within a folded strip will be superimposed on the edges of a spaced electrode within each of said other folded dielectric strips and then cutting the plurality of folded dielectric strips into a plurality of separate parts by laterally severing the superimposed strips at an intermediate point in said predetermined distance between the ends of adjacent and superimposed electrodes.

3. The process of making capacitors which comprises simultaneously unwinding a plurality of separate strips of dielectric material from rolls, simultaneously passing each strip between a separate pair of vertical, parallel and spaced rollers whereby each strip is folded longitudinally upon itself to form a U-shaped lateral cross section with the closed portion of the U below and the legs of the U extending vertically upward therefrom, simultaneously dropping a conducting electrode strip having a width less than the transverse width of the folded dielectric strips into each of the folds formed by said folded dielectric strip and thereafter simultaneously and successively dropping similar electrode strips into said folded dielectric strips so that the ends of corresponding electrodes in each dielectric strip will be spaced a predetermined and equal distance from the ends of an adjacent electrode, simultaneously and successively dropping a conducting tap strap having a length in excess of the transverse width of the folded dielectric strips into each of said folded dielectric strips so that a tap strap will be in contact with each spaced electrode strip, simultaneously passing each folded dielectric strip with electrodes and tap straps therein between another pair of vertical and parallel rollers which are spaced a lesser distance than each of said first mentioned pairs of rollers so that each assembled dielectric strip, electrodes and tap straps are effectively compressed therebetween, then passing each folded dielectric strip between a pair of horizontal parallel and spaced rollers whereby each dielectric strip is twisted into a horizontal plane and all dielectric strips are superimposed upon each other so that the folded longitudinal edge of a folded dielectric strip will be superimposed on the unfolded edges of an adjacent folded dielectric strip and the edges of each spaced electrode within a folded dielectric strip will be superimposed on the edges of a corresponding electrode within each of said other folded dielectric strips and then cutting the plurality of folded dielectric strips into a plurality of separate parts by laterally severing the superimposed strips at an intermediate point in said predetermined distance between the ends of adjacent and superimposed electrodes.

LEVIN W. FOSTER.
BENJAMIN H. GOLDY.

REFERENCES CITED

The following references are of record in the file of this patent:

UNITED STATES PATENTS

| Number | Name | Date |
| --- | --- | --- |
| 709,205 | Clausen | Sept. 16, 1902 |
| 1,279,941 | Thomas | Sept. 24, 1918 |
| 2,213,602 | Yates | Sept. 3, 1940 |
| 2,248,621 | Gillette | July 8, 1941 |
| 2,272,251 | Robinson | Feb. 10, 1942 |
| 2,328,520 | West | Aug. 31, 1943 |
| 2,387,759 | Jarvis | Oct. 30, 1945 |